United States Patent
Guo

(10) Patent No.: US 10,824,192 B2
(45) Date of Patent: Nov. 3, 2020

(54) METHOD FOR DETECTING WEARING-STATE AND WEARABLE DEVICE

(71) Applicant: Guangdong Oppo Mobile Telecommunications Corp., Ltd., Guangdong (CN)

(72) Inventor: Fuhao Guo, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 33 days.

(21) Appl. No.: 16/295,922

(22) Filed: Mar. 7, 2019

(65) Prior Publication Data

US 2019/0332141 A1    Oct. 31, 2019

(30) Foreign Application Priority Data

Apr. 26, 2018 (CN) .......................... 2018 1 0388473

(51) Int. Cl.
G06F 1/16 (2006.01)
H04W 76/10 (2018.01)
H04W 76/30 (2018.01)

(52) U.S. Cl.
CPC ............ G06F 1/163 (2013.01); H04W 76/10 (2018.02); H04W 76/30 (2018.02)

(58) Field of Classification Search
CPC ........ G06F 1/163; G06F 3/0346; G06F 3/017; G06F 1/3231; G06F 3/0304; H04W 76/30; H04W 76/10; G01D 21/00
See application file for complete search history.

(56) References Cited

U.S. PATENT DOCUMENTS

| | | | |
|---|---|---|---|
| 7,925,029 B2 * | 4/2011 | Hollemans | H04R 1/1041 381/151 |
| 9,508,259 B2 * | 11/2016 | Kim | G06F 1/163 |
| 9,632,532 B2 * | 4/2017 | Luna | G06F 3/0634 |
| 9,769,558 B2 * | 9/2017 | Chandramohan | H02J 7/0044 |
| 9,860,625 B2 * | 1/2018 | Tachibana | H04R 1/1041 |
| 9,973,845 B2 * | 5/2018 | Chawan | H04R 1/1016 |

(Continued)

FOREIGN PATENT DOCUMENTS

| CN | 103002373 A | 3/2013 |
|---|---|---|
| CN | 103167370 A | 6/2013 |

(Continued)

OTHER PUBLICATIONS

International search report issued in corresponding international application No. PCT/CN2019/077029 dated Jun. 12, 2019.

(Continued)

*Primary Examiner* — Ramesh B Patel

(57) ABSTRACT

A method for detecting a wearing-state and a wearable device are provided. The wearable device includes an infrared proximity sensor, an acceleration sensor, and a control circuit. The control circuit is configured to turn on the infrared proximity sensor in response to detecting, by the acceleration sensor, a user operation. The control circuit is configured to determine whether the wearable device is in a wearing state or a non-wearing state, according to a state of the infrared proximity sensor.

20 Claims, 5 Drawing Sheets

(56) References Cited

U.S. PATENT DOCUMENTS

| | | | |
|---|---|---|---|
| 10,003,881 B2* | 6/2018 | Cousins | H04R 1/1075 |
| 10,291,975 B2* | 5/2019 | Howell | H04R 1/1016 |
| 10,477,319 B2* | 11/2019 | Lou | H04R 5/033 |
| 2014/0288390 A1 | 9/2014 | Hong et al. | |
| 2015/0201854 A1* | 7/2015 | Hong | A61B 5/6886 |
| | | | 600/301 |
| 2015/0229749 A1* | 8/2015 | Cho | H04M 1/7253 |
| | | | 455/566 |
| 2015/0264474 A1* | 9/2015 | Seo | B60R 1/062 |
| | | | 381/74 |
| 2016/0081625 A1* | 3/2016 | Kim | H04W 4/70 |
| | | | 600/301 |
| 2016/0098138 A1* | 4/2016 | Park | H04M 1/7253 |
| | | | 345/173 |
| 2016/0120048 A1* | 4/2016 | Seo | H05K 5/0217 |
| | | | 600/301 |
| 2016/0241553 A1* | 8/2016 | Kim | H04L 67/125 |
| 2017/0023971 A1* | 1/2017 | Lee | A44C 5/0053 |
| 2017/0048706 A1 | 2/2017 | Kang et al. | |
| 2017/0075654 A1* | 3/2017 | Shin | H04R 25/00 |
| 2017/0094389 A1* | 3/2017 | Saulsbury | H04R 1/1016 |
| 2017/0094399 A1* | 3/2017 | Chandramohan | H02J 7/0044 |
| 2018/0008194 A1* | 1/2018 | Boesen | A61B 5/4866 |
| 2018/0063313 A1* | 3/2018 | Lee | H04M 1/7253 |
| 2018/0070166 A1* | 3/2018 | Howell | H04R 1/1016 |
| 2018/0124496 A1* | 5/2018 | Tachibana | H04R 1/1041 |
| 2018/0132031 A1* | 5/2018 | Seo | A61B 5/6802 |
| 2018/0341448 A1* | 11/2018 | Behzadi | G06F 3/0484 |
| 2019/0015045 A1* | 1/2019 | Li | G06F 1/3206 |
| 2019/0187950 A1* | 6/2019 | Takemura | G06F 3/165 |
| 2019/0246196 A1* | 8/2019 | Han | H04R 1/1016 |
| 2019/0335000 A1* | 10/2019 | Zhang | G08C 15/06 |

FOREIGN PATENT DOCUMENTS

| | | |
|---|---|---|
| CN | 105338447 A | 2/2016 |
| CN | 105786155 A | 7/2016 |
| CN | 106550126 A | 3/2017 |
| EP | 3291573 A1 | 3/2018 |

OTHER PUBLICATIONS

Extended European search report issued in corresponding European application No. 19162168.9 dated Aug. 7, 2019.

* cited by examiner

METHOD FOR DETECTING WEARING-STATE AND WEARABLE DEVICE

CROSS-REFERENCE TO RELATED APPLICATION(S)

This application claims priority to and the benefit of Chinese Application Patent Serial No. 201810388473.1, filed on Apr. 26, 2018, the entire disclosure of which is hereby incorporated by reference.

TECHNICAL FIELD

This disclosure relates to the field of electronic technology, and more particularly to a method for detecting a wearing-state and a wearable device.

BACKGROUND

Wearable devices refer to portable devices that are worn directly on users or integrated with users' clothes or accessories. The wearable devices may be wireless headphones, smart watches, glasses, earrings, buttons, helmets, or the like. Since the wearable device is for wearing by a user, it is necessary to detect whether the wearable device is in a wearing state.

SUMMARY

A method for detecting a wearing-state and a wearable device are provided.

In a first aspect of the present disclosure, a wearable device is provided. The wearable device includes an infrared proximity sensor, an acceleration sensor, and a control circuit. The infrared proximity sensor is disposed on a housing of the wearable device. The infrared proximity sensor is occluded when the wearable device is worn by a user. The acceleration sensor is configured to detect a user operation. The control circuit is configured to turn on the infrared proximity sensor in response to detecting, by the acceleration sensor, a user operation. The control circuit is configured to determine whether the wearable device is in a wearing state or a non-wearing state, according to a state of the infrared proximity sensor.

In a second aspect of the present disclosure, a method for detecting a wearing-state is provided. The method includes the following. A wearable device turns on an infrared proximity sensor, in response to detecting a user operation by an acceleration sensor. The infrared proximity sensor and the acceleration sensor are arranged in the wearable device. The wearable device determines whether the wearable device is in a wearing state or a non-wearing state, according to a state of the infrared proximity sensor.

In a third aspect of the present disclosure, a non-transitory computer readable storage medium is provided. The non-transitory computer readable storage medium stores a computer program which, when executed by a processor, causes the processor to carry out following actions. An infrared proximity sensor of a wearable device is turned on, in response to a user operation to be detected. Whether the wearable device is in a wearing state or a non-wearing state is determined according to a state of the infrared proximity sensor.

BRIEF DESCRIPTION OF DRAWINGS

To illustrate the technical solutions embodied by the implementations of the present disclosure or by the related art more clearly, the following briefly introduces the accompanying drawings required for describing the implementations or the related art. Apparently, the accompanying drawings in the following description merely illustrate some implementations of the present disclosure. Those of ordinary skill in the art may also obtain other drawings based on these accompanying drawings without creative efforts.

DETAILED DESCRIPTION

Figure 1A:
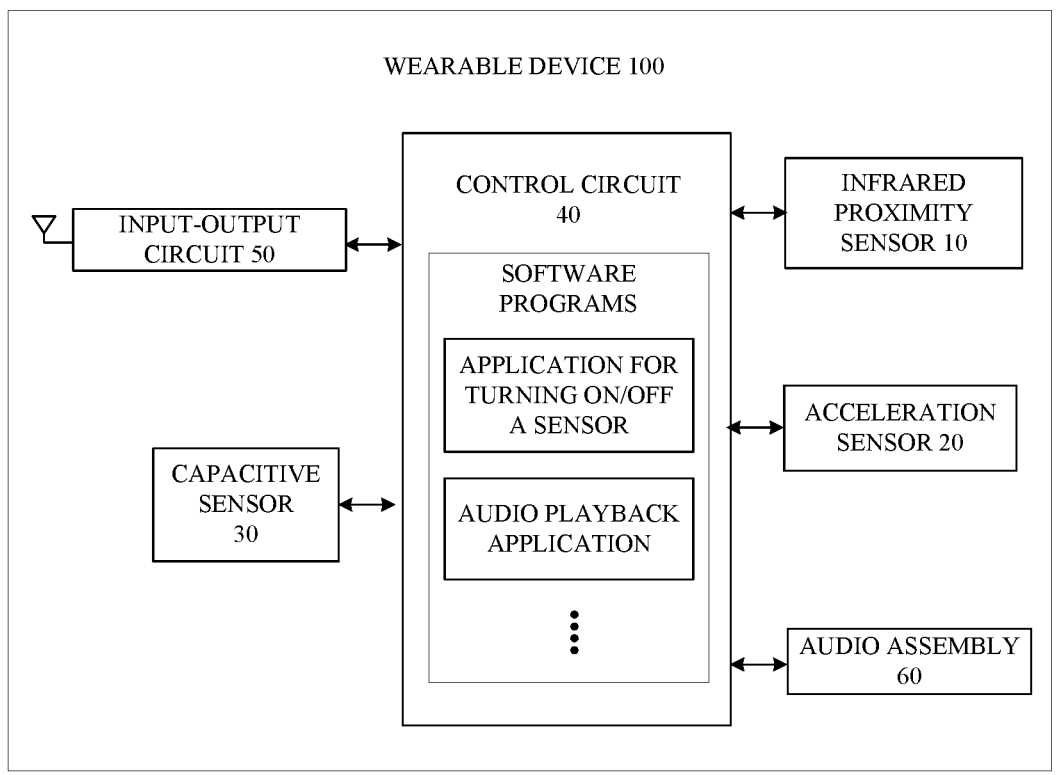
FIG. 1A is a schematic structural diagram illustrating a wearable device according to an implementation of the present disclosure.

In order for those skilled in the art to better understand technical solutions of the present disclosure, technical solutions in implementations of the present disclosure will be described clearly and completely hereinafter with reference to the accompanying drawings described in the previous chapter. Apparently, the described implementations are merely some rather than all implementations of the present disclosure. All other implementations obtained by those of ordinary skill in the art based on the implementations of the present disclosure without creative efforts shall fall within the protection scope of the present disclosure.

The following will give a detailed description.

The terms "first", "second", "third", and the like used in the specification, the claims, and the accompanying drawings of the present disclosure are used to distinguish different objects rather than describe a particular order. In addition, the terms "include", "comprise", and "have" as well as variations thereof are intended to cover non-exclusive inclusion. For example, a process, method, system, product, or apparatus including a series of steps or units is not limited to the listed steps or units. Instead, it can optionally include other steps or units that are not listed; optionally, other steps or units inherent to the process, method, product, or device can also be included.

The term "implementation" referred to herein means that a particular feature, structure, or feature described in conjunction with the implementation may be contained in at least one implementation of the present disclosure. The phrase appearing in various places in the specification does not necessarily refer to the same implementation, nor does it refer to an independent or alternative implementation that is mutually exclusive with other implementations. It is explicitly and implicitly understood by those skilled in the art that an implementation described herein may be combined with other implementations.

"Mobile terminal" in implementations of the disclosure may include various devices with wireless communication functions such as handheld devices, on-board devices, and computing devices, or other processing devices connected to a wireless modem, as well as various forms of user equipment (UE), mobile stations (MS), terminal devices, and so on.

The wearable devices may include wireless headphones, smart bands, smart earrings, smart buttons, smart rings, smart glasses, helmets, etc., and the wearable device can support functions such as incoming call answering, audio playback, audio collection, gesture acquisition, and tap-signal acquisition.

Hereinafter, implementations of the disclosure will be described in detail.

According to an implementation of the disclosure, a wearable device is provided. The wearable device includes an infrared proximity sensor, an acceleration sensor, and a control circuit. The infrared proximity sensor is disposed on a housing of the wearable device. The infrared proximity sensor is occluded when the wearable device is worn by a user. The acceleration sensor is configured to detect a user operation. The control circuit is configured to turn on the infrared proximity sensor in response to detecting, by the acceleration sensor, a user operation. The control circuit is configured to determine whether the wearable device is in a wearing state or a non-wearing state, according to a state of the infrared proximity sensor.

According to an implementation of the disclosure, a method for detecting a wearing-state is provided. The method includes the following. A wearable device turns on an infrared proximity sensor, in response to detecting a user operation by an acceleration sensor. The wearable device determines whether the wearable device is in a wearing state or a non-wearing state, according to a state of the infrared proximity sensor. The wearable device includes the infrared proximity sensor and the acceleration sensor.

According to an implementation of the disclosure, a non-transitory computer readable storage medium is provided. The non-transitory computer readable storage medium stores a computer program which, when executed by a processor, causes the processor to carry out following actions. An infrared proximity sensor of a wearable device is turned on, in response to a user operation to be detected. Whether the wearable device is in a wearing state or a non-wearing state is determined according to a state of the infrared proximity sensor.

Implementations of the disclosure will be detailed below with reference to the accompanying drawings.

FIG. 1A is a schematic structural diagram illustrating a wearable device 100 according to an implementation of the present disclosure. As illustrated in FIG. 1A, the wearable device 100 includes an infrared proximity sensor 10, an acceleration sensor 20, a capacitive sensor 30, a control circuit 40, an input-output circuit 50, and an audio assembly 60. The infrared proximity sensor 10, the acceleration sensor 20, the capacitive sensor 30, the input-output circuit 50, and the audio assembly 60 are coupled with the control circuit 40.

The control circuit 40 is configured to turn on the infrared proximity sensor 10 when a user operation is detected by the acceleration sensor 20. The control circuit 40 is configured to determine whether the wearable device 100 is in a wearing state or a non-wearing state, according to a state of the infrared proximity sensor 10. The user operation may be a put-in operation, a take-out operation, or other operations. The state of the infrared proximity sensor 10 may include a proximity state, a distant state, or other states. The "put-in operation" refers to an operation that the user put the wearable device such as a headphone in his or her ears, and the "take-out operation" refers to an operation that the user take the wearable device such as a headphone out off his or her ears. The "proximity state" refers to a state where the wearable device is in contact with the users' body, for example, in contact with the user's ears, and the "distant state" refers to a state where the wearable device is not in contact with the user's body, such as the user's ears.

In one implementation, when the user operation is a put-in operation and the infrared proximity sensor 10 is in a proximity state, the control circuit 40 is configured to determine that the wearable device 100 is in the wearing state. In another implementation, when the user operation is a take-out operation and the infrared proximity sensor 10 is in a distant state, the control circuit 40 is configured to determine that the wearable device 100 is in the non-wearing state.

Whether the infrared proximity sensor 10 is in the proximity state or the distant state can be determined according to the working principle of the infrared proximity sensor 10, such as according to infrared reflection duration and the like, which will not be detailed herein.

In one implementation, the control circuit 40 is further configured to determine that the acceleration sensor 20 detects the put-in operation, when acceleration continuously detected by the acceleration sensor 20 in a first duration has a magnitude greater than zero and is in an upward direction, where the first duration is longer than or equal to a first threshold.

In one implementation, the control circuit 40 is further configured to determine that the acceleration sensor 20 detects the take-out operation, when acceleration continuously detected by the acceleration sensor 20 in a second duration has a magnitude greater than zero and is in a downward direction, where the second duration is longer than or equal to a second threshold.

In one implementation, the control circuit 40 is further configured to turn off the infrared proximity sensor 10, after determining that the wearable device 100 is in the wearing state or the non-wearing state.

As can be seen, the wearable device 100 determines whether the wearable device 100 is in the wearing state or the non-wearing state via both the infrared proximity sensor 10 and the acceleration sensor 20, which improves accuracy of wearing-state detection. The infrared proximity sensor 10 is turned on only when the acceleration sensor 20 detects the put-in operation or the take-out operation, rather than being always in a working state, and resource consumption can be reduced accordingly.

Figure 1B:
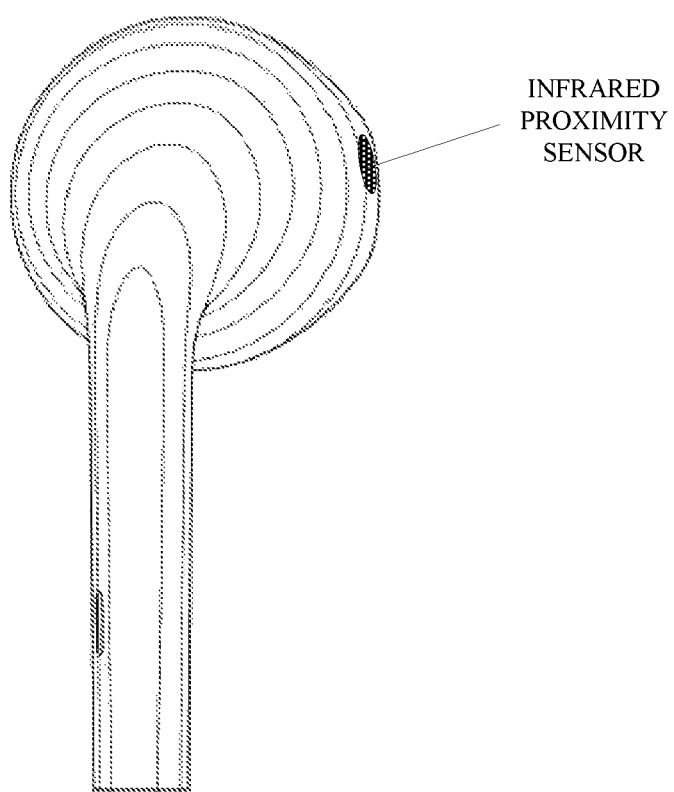
FIG. 1B is a schematic diagram illustrating an example of a location of an infrared proximity sensor according to an implementation of the present disclosure.

As illustrated in FIG. 1B, the infrared proximity sensor 10 is disposed on a housing of the wearable device 100. When the wearable device 100 is worn by a user, the infrared proximity sensor 10 is occluded.

The control circuit 40 may include a processor and a memory. The memory may be a hard disk drive, a non-transitory memory (e.g., a flash memory or other electronically programmable read only memories used to form solid-state drives, etc.), a transitory memory (e.g., a static random access memory or a dynamic random access memory), and the like, and implementations of the present disclosure are not limited thereto. The processor is configured to control operations of the wearable device 100. Operations controlled by the processor can be implemented based on one or more microprocessors, microcontrollers, digital signal processors, baseband processors, power management units, audio codec chips, application-specific integrated circuits, display driver integrated circuits, and the like.

The processor can be configured to connect various parts of the whole wearable device 100 through various interfaces and lines to run or execute software programs and/or modules stored in the memory, such as an application for turning on/off a sensor, an application for establishing a communication connection with a mobile terminal, an application for disconnecting a communication connection with a mobile terminal, an application for communicating with a mobile terminal, an audio playback application, and the like. The software programs may be used to execute some control operations, such as infrared proximity sensor-based proximity state measurements, acceleration sensor-based acceleration measurements, capacitive sensor-based capacitance measurements, audio assembly-based audio collection, audio assembly-based audio playback, and other functions of the wearable device 100, and implementations of the present disclosure are not particularly restricted.

The input-output circuit 50 is configured to achieve data input and data output of the wearable device 100, that is, to allow the wearable device 100 to receive data from an external apparatus and also to allow the wearable device 100 to output data to an external apparatus. The input-output circuit 50 may include analog-and-digital input-output interface circuits and wireless communication circuits based on radio frequency signals and/or optical signals. The wireless communication circuit of the input-output circuit 50 may include a radio frequency transceiver circuit, a power amplifier circuit, a low-noise amplifier, a switch, and a filter. For example, the wireless communication circuit of the input-output circuit 50 includes a circuit for supporting near field communication (NFC) by transmitting and receiving near field coupled electromagnetic signals. Specifically, the input-output circuit 50 includes an NFC antenna and an NFC transceiver.

The audio assembly 60 is configured to provide the wearable device 100 with audio input and output functions. The audio assembly 60 of the wearable device 100 may include speakers, microphones, buzzers, tone generators, and other assemblies for generating and detecting sound.

The wearable device 100 may further include a battery (not illustrated) for supplying electrical energy to the wearable device 100.

The wearable device 100 may further include other input-output units (not illustrated). The other input-output units include but not limited to buttons, joysticks, click wheels, scroll wheels, touch pads, keypads, keyboards, cameras, light-emitting diodes (LEDs), and other status indicators.

Figure 1C:
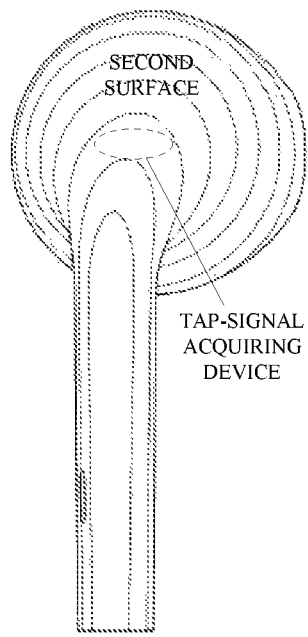
FIG. 1C is a schematic diagram illustrating an example of a location of a tap-signal acquiring device according to an implementation of the present disclosure.

The wearable device 100 may further include a tap-signal acquiring device. As illustrated in FIG. 1C, the tap-signal acquiring device is disposed under a second surface of the wearable device 100. The second surface is not in contact with skin of the user when the wearable device 100 is in a wearing state. The wearable device 100 can acquire a tap-signal input by the user via the tap-signal acquiring device. The tap-signal includes at least one of the number of times of tap, a tap frequency, and a combination of tap operations. The combination of tap operations is composed of multiple tap operations. The multiple tap operations each include simple tap operations or complicated tap operations, or the multiple tap operations include both simple tap operations and complicated tap operations, which is not limited herein. The tap-signal acquiring device may include at least one of a capacitive sensor, a pressure sensor, and a camera, and the like.

Figure 1D:
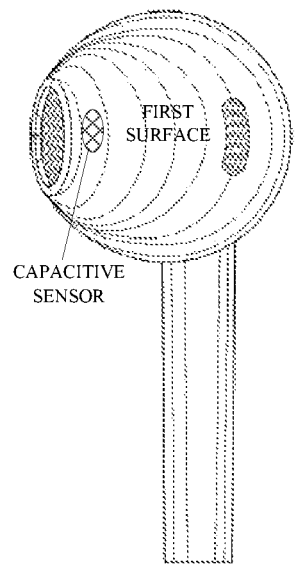
FIG. 1D is a schematic diagram illustrating an example of a location of a capacitive sensor according to an implementation of the present disclosure.

As illustrated in FIG. 1D, the capacitive sensor 30 is disposed on a first surface of the wearable device 100. The first surface is in contact with skin of the user when the wearable device 100 is worn by the user.

In one implementation, the control circuit 40 is further configured to turn on the capacitive sensor 30 and to determine whether a capacitance value detected by the capacitive sensor 30 is equal to zero or not. In addition, the control circuit 40 may turn on the capacitive sensor 30 when the infrared proximity sensor 10 is turned on, the control circuit 40 may turn on the capacitive sensor 30 when the infrared proximity sensor 10 is in the proximity state, the control circuit 40 may turn on the capacitive sensor 30 when the infrared proximity sensor 10 is in the distant state, or other suitable time, which is not limited herein.

In one implementation, the control circuit 40 may be further configured to conduct at least one of: determining that the wearable device 100 is in the wearing state, when the infrared proximity sensor 10 is in the proximity state and the capacitance value detected by the capacitive sensor 30 is not equal to zero, and determining that the wearable device 100 is in the non-wearing state, when the infrared proximity sensor 10 is in the distant state and the capacitance value detected by the capacitive sensor 30 is equal to zero.

In one implementation, the control circuit 40 is further configured to establish a communication connection with a mobile terminal when the wearable device 100 is in the wearing state. The control circuit 40 is further configured to disconnect the communication connection with the mobile terminal when the wearable device 100 is in the non-wearing state.

In one implementation, the control circuit 40 may be further configured to turn off the infrared proximity sensor 10 and the capacitive sensor 30, after determining that the wearable device 100 is in the wearing state or the non-wearing state.

As can be seen, the infrared proximity sensor 10 and the capacitive sensor 30 are not always in a working state, and resource consumption can be reduced accordingly. The wearable device 100 determines whether the wearable device 100 is in the wearing state or the non-wearing state via the infrared proximity sensor 10, the acceleration sensor 20, and the capacitive sensor 30, which further improves accuracy of wearing-state detection compared with the situation where no capacitive sensor 30 is provided.

It should be noted that the foregoing components of the wearable device 100 can be configured to implement parts or all of the methods described below. In addition, FIG. 1B, FIG. 1C, and FIG. 1D are merely illustrative, and implementations of the present disclosure are not limited thereto.

Figure 2:
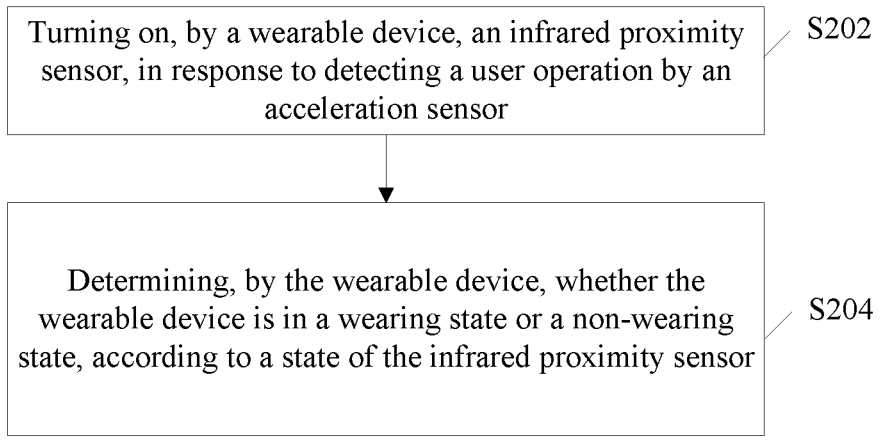
FIG. 2 is a schematic flowchart illustrating a method for detecting a wearing-state according to an implementation of the present disclosure.

According to implementations of the disclosure, a method for detecting a wearing-state is provided. The method is performed by a wearable device. The wearable device can be the one illustrated in FIGS. 1A-1D. The wearable device may include an infrared proximity sensor and an acceleration sensor. The wearable device may further include a capacitive sensor. As illustrated in FIG. 2, the method begins at block 202.

At 202, a wearable device turns on an infrared proximity sensor, in response to detecting a user operation by an acceleration sensor.

At 204, the wearable device determines whether the wearable device is in a wearing state or a non-wearing state according to a state of the infrared proximity sensor.

The user operation may be a put-in operation or a take-out operation, and the state of the infrared proximity sensor can be a proximity state or a distant state. When the put-in operation is detected and the infrared proximity sensor is in the proximity state, it can be determined that the wearable device is in the wearing state; on the other hand, when the take-out operation is detected and the infrared proximity sensor is in the distant state, it can be determined that the wearable device is not in the wearing state, that is, in a non-wearing state, such as being powered off, placing in user's bag or charging box or the like.

If the user operation is a put-in operation, the wearable device can be determined as in the wearing state when the infrared proximity sensor is in a proximity state.

In this case, prior to turning on the infrared proximity sensor, first determine that the acceleration sensor detects the put-in operation, when acceleration continuously detected by the acceleration sensor in a first duration has a magnitude greater than zero and is in an upward direction, where the first duration is longer than or equal to a first threshold.

After determining that the wearable device is in the wearing state, the wearable device can establish a communication connection with a mobile terminal.

If the user operation is a take-out operation, the wearable device can be determined as in the non-wearing state when the infrared proximity sensor is in a distant state.

In this case, prior to turning on the infrared proximity sensor, first determine that the acceleration sensor detects the take-out operation, when acceleration continuously detected by the acceleration sensor in a second duration has a magnitude greater than zero and is in a downward direction, where the second duration is longer than or equal to a second threshold.

After determining that the wearable device is in the non-wearing state, the wearable device can disconnect the communication connection with the mobile terminal.

After determining that the wearable device is in the wearing state or the non-wearing state, the wearable device can turn off the infrared proximity sensor.

In case that the capacitive sensor is included in the wearable device, the capacitive sensor can be turned on and whether a capacitance value detected by the capacitive sensor is equal to zero or not can be determined. In addition, the wearable device may turn on the capacitive sensor when the infrared proximity sensor is turned on, the wearable device may turn on the capacitive sensor when the infrared proximity sensor is in the proximity state, the wearable device may turn on the capacitive sensor when the infrared proximity sensor is in the distant state, or other suitable time, which is not limited herein.

In one implementation, if the user operation is a put-in operation, the wearable device determines that the wearable device is in the wearing state, when the infrared proximity sensor is in a proximity state and the capacitance value detected by the capacitive sensor is not equal to zero.

After determining that the wearable device is in the wearing state, the wearable device can establish a communication connection with a mobile terminal.

In one implementation, if the user operation is a take-out operation, the wearable device determines that the wearable device is in the non-wearing state, when the infrared proximity sensor is in a distant state and the capacitance value detected by the capacitive sensor is equal to zero.

Whether the put-in operation or the take-out operation can be detected according to the working principle of the acceleration sensor, such as according to the magnitude and direction of the acceleration detected by the acceleration sensor and the like, which will not be detailed herein.

After determining that the wearable device is in the non-wearing state, the wearable device can disconnect the communication connection with the mobile terminal.

After determining that the wearable device is in the wearing state or the non-wearing state, the wearable device can turn off the infrared proximity sensor and the capacitive sensor.

Another more detailed method is further provided. The method is applicable to the foregoing wearable device and may include the following.

A wearable device turns on an infrared proximity sensor, when an acceleration sensor detects a put-in operation. The wearable device determines that the wearable device is in a wearing state, when the infrared proximity sensor is in a proximity state.

In one implementation, the acceleration sensor may be turned on by the wearable device when the wearable device is turned on, or the acceleration sensor may be turned on by the wearable device when the wearable device is taken out of a box for receiving the wearable device. As an implementation, in addition to receiving the wearable device, the box can also charge the wearable device.

The operating principle of the infrared proximity sensor provided herein is as follows. Whether the infrared proximity sensor is in a proximity state or in a distant state can be determined based on a time point at which infrared light is emitted and a time point at which the infrared light is reflected back. In implementations of the present disclosure, since the infrared proximity sensor is disposed on a housing of the wearable device, the infrared proximity sensor is occluded when the wearable device is worn by a user. In this case, a time difference between the time point when the infrared proximity sensor emits infrared light and the time point when the infrared proximity sensor receives the infrared light is almost zero. At this time, the infrared proximity sensor is considered to be in the proximity state. On the other hand, when the wearable device is not worn by the user (i.e., in a non-wearing state), the infrared proximity sensor is not occluded. In this case, the time difference between the time point when the infrared proximity sensor emits the infrared light and the time point when the infrared proximity sensor receives the infrared light is far greater than zero. At this time, the infrared proximity sensor is considered to be in the distant state.

When the wearable device is stationary, acceleration detected by an acceleration sensor has a magnitude close to zero. On the other hand, when the wearable device is picked up, the acceleration detected by the acceleration sensor has a magnitude far greater than zero. In addition, the acceleration detected by the acceleration sensor has a direction. As such, whether a put-in operation or a take-out operation has been detected can be determined based on the magnitude and direction of the acceleration detected by the acceleration sensor.

As an implementation, when acceleration continuously detected by the acceleration sensor in a first duration has a magnitude greater than zero and is in an upward direction, determine that the operation detected by the acceleration sensor is the put-in operation. The first duration is longer than or equal to a first threshold. On the other hand, when acceleration continuously detected by the acceleration sensor in a second duration has a magnitude greater than zero and is in a downward direction, determine that the operation detected by the acceleration sensor is the take-out operation. The second duration is longer than or equal to a second threshold.

Assuming that the wearable device is a wireless headphone. Putting the wireless headphone into an ear by a user is usually achieved as follows. The wireless headphone is picked up by user's hand and then lifted up, and finally put into the ear. When the wireless headphone is picked up by the user and is then lifted up, acceleration detected by an acceleration sensor in a time period is in an upward direction and has a magnitude greater than zero. In this situation, it is considered that the put-in operation is detected. Taking the wireless headphone out of the ear by the user is usually achieved as follows. The wireless headphone is taken out of user's ear and then put down. When the wireless headphone is put down, the acceleration detected by the acceleration sensor in the time period is in a downward direction and has a magnitude greater than zero. In this situation, it is considered that the take-out operation is detected.

As can be seen, in implementations of the present disclosure, the wearable device determines whether the wearable device is worn (i.e., in the wearing state) via both the infrared proximity sensor and the acceleration sensor, which improves accuracy of wearing-state detection. In addition, the infrared proximity sensor is turned on only when the acceleration sensor detects the put-in operation, instead of being always in a working state, thereby reducing resource consumption.

In one implementation, the method further includes the following. The wearable device turns off the infrared proximity sensor when the wearable device is in the wearing state.

It can be seen that in the present disclosure, the infrared proximity sensor is mainly configured to assist the acceleration sensor to detect whether the wearable device is in a wearing state or a non-wearing state. To this end, the infrared proximity sensor can be turned off after the wearable device is determined to be in the wearing state, which reduces resource consumption.

In one implementation, the method further includes the following. The wearable device turns on the infrared proximity sensor, when a take-out operation has been detected by the acceleration sensor. The wearable device determines that the wearable device is in a non-wearing state when the infrared proximity sensor is in a distant state.

As can be seen, in implementations of the present disclosure, the infrared proximity sensor is turned on only when the acceleration sensor detects the take-out operation, instead of being always in a working state, which can reduce resource consumption.

In one implementation, the method further includes the following. The wearable device turns off the infrared proximity sensor when the wearable device is in the non-wearing state.

It can be seen that in the present disclosure, the infrared proximity sensor is mainly configured to assist the acceleration sensor to detect whether the wearable device is in a wearing state or a non-wearing state. To this end, the infrared proximity sensor will be turned off after the wearable device is determined to be in the non-wearing state, thereby reducing resource consumption.

In one implementation, the method further includes the following before the wearable device determines that the wearable device is in the wearing state. The wearable device turns on a capacitive sensor. The wearable device determines that a capacitance value detected by the capacitive sensor is not equal to zero.

In addition, the wearable device may turn on the capacitive sensor when the infrared proximity sensor is turned on, or the wearable device may turn on the capacitive sensor when the infrared proximity sensor is in the proximity state, which is not limited herein.

When the wearable device is stationary, a capacitance value detected by a capacitive sensor has a magnitude close to zero. When the wearable device is worn by a user, since the capacitive sensor is in contact with skin of the user, the capacitance value detected by the capacitive sensor is far greater than zero (in other word, the capacitance value is not equal to zero). In this situation, the wearable device is considered to be in a wearing state. On the other hand, when the wearable device is not worn by the user, since there is nothing in contact with the capacitive sensor, the capacitance value detected by the capacitive sensor is close to zero (in other word, the capacitance value is zero). In this situation, the wearable device is considered to be in a non-wearing state.

It can be seen that, in the implementations of the present disclosure, in addition to determining whether the wearable device is worn (i.e., in the wearing state) via the acceleration sensor and the infrared proximity sensor, the capacitive sensor is also introduced to determine, together with the acceleration sensor and the infrared proximity sensor, whether the wearable device is worn, thereby improving accuracy of wearing-state detection. In addition, the capacitive sensor is not operating all the time, which reduces resource consumption.

In one implementation, the method further includes the following. The wearable device turns off the infrared proximity sensor and the capacitive sensor when the wearable device is in the wearing state.

It can be seen that in the present disclosure, the infrared proximity sensor and the capacitive sensor are mainly configured to assist the acceleration sensor to detect whether the wearable device is in a wearing state or a non-wearing state. Therefore, the infrared proximity sensor and the capacitive sensor can be turned off after the wearable device is determined to be in the wearing state, which reduces resource consumption In one implementation, the method further includes the following. The wearable device turns on the infrared proximity sensor and the capacitive sensor, when the acceleration sensor detects the take-out operation. The wearable device determines that the wearable device is in the non-wearing state, when the infrared proximity sensor is in the distant state and the capacitance value detected by the capacitive sensor is equal to zero.

As can be seen, the infrared proximity sensor and the capacitive sensor are not operating all the time, and therefore resource consumption can be reduced.

In one implementation, the method further includes the following. The wearable device turns off the infrared proximity sensor and the capacitive sensor when the wearable device is in the non-wearing state.

It can be seen that in the present disclosure, the infrared proximity sensor and the capacitive sensor are mainly configured to assist the acceleration sensor to detect whether the wearable device is in a wearing state or a non-wearing state. Therefore, the infrared proximity sensor and the capacitive sensor can be turned off after the wearable device is determined to be in the non-wearing state, which reduces resource consumption.

In one implementation, in case that the wearable device does not establish a communication connection with any mobile terminal, the method further includes the following.

The wearable device establishes a communication connection with a mobile terminal when the wearable device is in the wearing state. The wearable device disconnects the communication connection with the mobile terminal when the wearable device is in the non-wearing state.

The mobile terminal currently in communication with the wearable device may be a mobile terminal that was connected to the wearable device last time, or may be a mobile terminal that is set to be fixedly connected by the wearable device, which is not limited herein.

As can be seen, after determining that the wearable device has been worn successfully, the communication connection with the mobile terminal will be established directly, and there is no need for the user to establish the communication connection manually, which is simple and convenient and can improve user experience. After determining that the wearable device has been removed, the communication connection with the mobile terminal will be disconnected directly, and there is no need for the user to disconnect the communication connection manually, which is simple and convenient and can improve user experience.

In one implementation, the method further includes the following before the wearable device determines that the wearable device is in the wearing state. The wearable device prompts, via an audio assembly, a user to input a voice for confirming that the wearable device has been worn. The wearable device collects the voice input by the user via the audio assembly. The wearable device obtains at least one keyword by parsing the voice. The wearable device determines that at least one of the at least one keyword is matched with a set keyword.

The set keyword includes, but is not limited to, the words of "wearing", "have/has", "complete/completed", "successful/successfully", "wear/worn", "put on", and the like.

For example, assuming that the voice is "has been worn", keywords obtained by parsing the voice contain the words "has" and "worn", and these two keywords obtained match the set keyword.

Assuming that the wearable device is a wireless headphone, since the user is prompted via the audio assembly, if the wireless headphone has been worn by the user, a prompt output by the wireless headphone can be heard by the user, and the user can confirm the wearing state again according to the prompt, which can improve the accuracy of wearing-state confirmation.

In one implementation, the method further includes the following before the wearable device determines that the wearable device is in the wearing state. The wearable device prompts, via an audio assembly, a user to input a gesture for confirming that the wearable device has been worn. The wearable device recognizes, via a gesture sensor, the gesture of the user, where the gesture sensor includes a camera. The wearable device determines that the gesture of the user is matched with a set gesture (that is, a gesture set in advance).

As an implementation, the set gesture is a single gesture, such as a finger-snap gesture, a sliding gesture to the left, a sliding gesture to the right, an upward sliding gesture, a downward sliding gesture, an ok gesture, and the like. As another implementation, the set gesture is a combination of multiple gestures. For example, a combination of a finger-snap gesture and a sliding gesture to the left, a combination of a sliding gesture to the left and a sliding gesture to the right, a combination of a finger-snap gesture and an ok gesture, a combination of an upward sliding gesture and a downward sliding gesture, and other gesture combinations.

Assuming that the wearable device is a wireless headphone, since the user is prompted via the audio assembly, if the user wears the wireless headphone already, a prompt output by the wireless headphone can be heard by the user, the user can confirm the wearing state again according to the prompt, and it is possible to improve accuracy of wearing-state confirmation.

In one implementation, the method further includes the following before the wearable device determines that the wearable device is in the wearing state. The wearable device prompts, via an audio assembly, a user to input a tap-signal for confirming that the wearable device has been worn. The wearable device acquires, via a tap-signal acquiring device, the tap-signal input by the user. The wearable device determines that the tap-signal is matched with a set tap-signal (that is, a tap-signal set in advance).

The set tap-signal referred to herein is input by tapping for a predetermined number of times in a predetermined tapping manner. The predetermined tapping manner may relates to a simple tap operation or a combination of multiple simple tap operations, which is not limited herein.

Assuming that the wearable device is a wireless headphone, since the user is prompted via the audio assembly, if the user wears the wireless headphone already, a prompt output by the wireless headphone can be heard by the user, the user can confirm the wearing state again according to the prompt, which can improve accuracy of wearing-state confirmation.

In one implementation, in case that the wearable device has established a communication connection with a mobile terminal, the method further includes the following after the wearable device determines that the wearable device is in the wearing state. The wearable device sends first information to the mobile terminal in communication with the wearable device, where the first information is used for reminding a user that the wearable device has been worn. After receiving the first information, the mobile terminal conducts a prompt operation according to the first information.

The first information is user-defined or customizable by the wearable device, which is not limited herein. The first information may be text information, audio information, or text information and audio information, which is not limited herein.

When the wearable device determines that it has been worn by the user, the wearable device will notify the mobile terminal in communication with the wearable device that the wearable device is in the wearing state. In this case, the mobile terminal can determine whether to communicate with the wearable device according to a state of the wearable device, which prevents the mobile terminal from conducting useless communication, thereby improving communication efficiency.

In one implementation, the method further includes the following after the wearable device determines that the wearable device is in the wearing state. The wearable device sends second information to the mobile terminal in communication with the wearable device, where the second information includes vibration data used for reminding a user that the wearable device has been worn. After receiving the second information, the mobile terminal conducts a vibration operation according to the vibration data contained in the second information.

The vibration data is user-defined or customizable by the wearable device, which is not limited herein. The vibration data may include vibration data at a same frequency, part of vibration data at a same frequency and the other vibration data at different frequencies, or vibration data each at a different frequency.

When the wearable device determines that it has been worn by the user, the wearable device will notify the mobile terminal in communication with the wearable device that the wearable device is in the wearing state. In this case, the mobile terminal can determine whether to communicate with the wearable device according to a state of the wearable device, which prevents the mobile terminal from conducting useless communication, thereby improving communication efficiency.

In one implementation, the method further includes the following after the wearable device determines that the wearable device is in the wearing state. The wearable device sends third information to the mobile terminal in communication with the wearable device, where the third information contains an animation used for indicating that the wearable device has been worn. After receiving the third information, the mobile terminal displays the animation contained in the third information.

The animation is user-defined or customizable by the wearable device, which is not limited herein. The animation may be an animation in which a user puts on a wearable device successfully. For instance, if the wearable device is a wireless headphone, the animation can be an animation in which the wireless headphone is held by user's hand and put on user's ear successfully.

When the wearable device determines that it has been worn by the user, the wearable device will notify the mobile terminal in communication with the wearable device that the wearable device is in the wearing state. In this case, the mobile terminal can determine whether to communicate with the wearable device according to a state of the wearable device, which prevents the mobile terminal from conducting useless communication, thereby improving communication efficiency.

It may be understood that, when the wearable device is a wireless headphone, the wearing state refers to a state where the wireless headphone is put in user's ear, and the non-wearing state refers to a state where the wireless headphone is taken out of user's ear.

Figure 3:
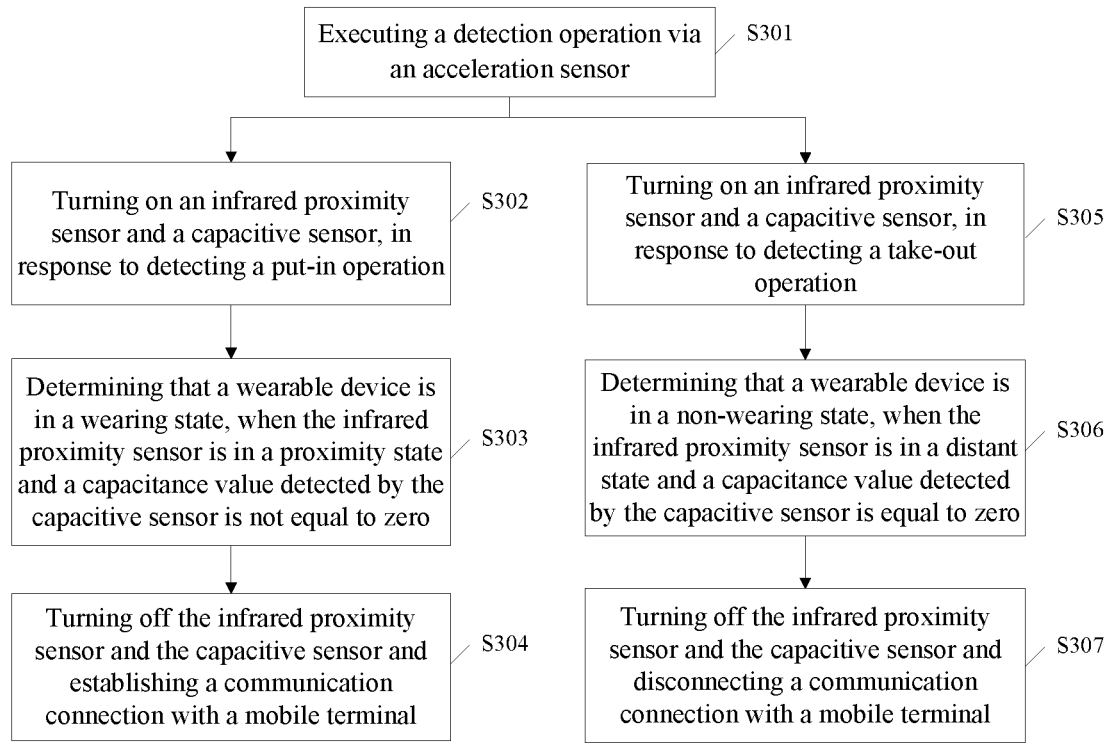
FIG. 3 is a schematic flowchart illustrating another method for detecting a wearing-state according to an implementation of the present disclosure.

Another more detailed method is further provided according to an implementation of the present disclosure. The method is applicable to the foregoing wearable device. As illustrated in FIG. 3, the method begins at block 301.

At block 301, a wearable device executes a detection operation via an acceleration sensor.

At block 302, the wearable device turns on an infrared proximity sensor and a capacitive sensor, when the acceleration sensor detects a put-in operation.

At block 303, the wearable device determines that the wearable device is in a wearing state, when the infrared proximity sensor is in a proximity state and a capacitance value detected by the capacitive sensor is not equal to zero.

At block 304, the wearable device turns off the infrared proximity sensor and the capacitive sensor and establishes a communication connection with a mobile terminal.

At block 305, the wearable device turns on the infrared proximity sensor and the capacitive sensor, when the acceleration sensor detects a take-out operation.

At block 306, the wearable device determines that the wearable device is in a non-wearing state, when the infrared proximity sensor is in a distant state and the capacitance value detected by the capacitive sensor is equal to zero.

At block 307, the wearable device turns off the infrared proximity sensor and the capacitive sensor and disconnects the communication connection with the mobile terminal.

It should be noted that the implementation process illustrated in FIG. 3 will not be detailed herein and reference may be made to the method implementations.

Figure 4:
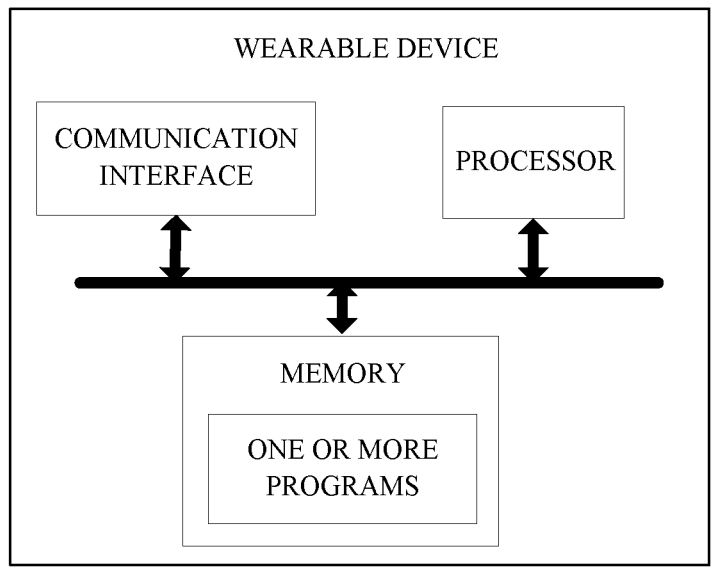
FIG. 4 is a schematic structural diagram illustrating another wearable device according to an implementation of the present disclosure.

Consistent with the implementations illustrated in FIG. 2 and FIG. 3, FIG. 4 is a schematic structural diagram illustrating a wearable device according to an implementation of the present disclosure. As illustrated in FIG. 4, the wearable device includes a processor, a memory, a communication interface, and one or more programs. The one or more programs are stored in the memory and configured to be executed by the processor. The one or more programs include instructions operable to execute the following actions. An infrared proximity sensor is turned on when an acceleration sensor detects a user operation. The infrared proximity sensor is disposed on a housing of the wearable device, and is occluded when the wearable device is worn by a user. Whether the wearable device is in a wearing state or a non-wearing state is determined according to a state of the infrared proximity sensor.

The user operation may be a put-in operation or a take-out operation, and the state of the infrared proximity sensor can be a proximity state or a distant state.

In one implementation, in terms of determining whether the wearable device is in the wearing state or the non-wearing state according to the state of the infrared proximity sensor, the one or more programs include instructions operable to execute the following actions. The wearable device is determined to be in the wearing state, when the put-in operation is detected and the infrared proximity sensor is in a proximity state.

In one implementation, the one or more programs further include instructions operable to execute the following actions. Prior to turning on the infrared proximity sensor, when acceleration continuously detected by the acceleration sensor in a first duration has a magnitude greater than zero and is in an upward direction, it is determined that the acceleration sensor detects the put-in operation, where the first duration is longer than or equal to a first threshold.

In one implementation, the one or more programs further include instructions operable to execute the following actions. After determining that the wearable device is in the wearing state, the wearable device can establish a communication connection with a mobile terminal.

In one implementation, in terms of determining whether the wearable device is in the wearing state or the non-wearing state according to the state of the infrared proximity sensor, the one or more programs include instructions operable to execute the following actions. The wearable device is determined to be in the non-wearing state, when the take-out operation is detected and the infrared proximity sensor is in a distant state.

In one implementation, the one or more programs further include instructions operable to execute the following actions. Prior to turning on the infrared proximity sensor, when acceleration continuously detected by the acceleration sensor in a second duration has a magnitude greater than zero and is in a downward direction, it is determined that the acceleration sensor detects the take-out operation, where the second duration is longer than or equal to a second threshold.

In one implementation, the one or more programs further include instructions operable to execute the following actions. After determining that the wearable device is in the non-wearing state, the wearable device can disconnect the communication connection with the mobile terminal.

In one implementation, the one or more programs further include instructions operable to execute the following actions. The infrared proximity sensor is turned off after determining that the wearable device is in the wearing state or the non-wearing state.

In one implementation, the one or more programs further include instructions operable to execute the following actions. A capacitive sensor is turned on and whether a capacitance value detected by the capacitive sensor is equal to zero or not is determined. In addition, the capacitive sensor may be turned on when the infrared proximity sensor is turned on, the capacitive sensor may be turned on when the infrared proximity sensor is in the proximity state, the capacitive sensor may be turned on when the infrared proximity sensor is in the distant state, or other suitable time, which is not limited herein. The capacitive sensor is disposed on a first surface of the wearable device. The first surface is in contact with skin of the user when the wearable device is worn by the user.

In one implementation, the one or more programs further include instructions operable to execute the following actions. The wearable device is determined to be in the wearing state, when the put-in operation is detected, the infrared proximity sensor is in the proximity state, and the capacitance value detected by the capacitive sensor is not equal to zero.

In one implementation, the one or more programs further include instructions operable to execute the following actions. The wearable device is determined to be in the non-wearing state when the take-out operation is detected, the infrared proximity sensor is in the distant state, and the capacitance value detected by the capacitive sensor is equal to zero.

In one implementation, the one or more programs further include instructions operable to execute the following actions. When acceleration continuously detected by the acceleration sensor in a first duration has a magnitude greater than zero and is in an upward direction, determine that the operation detected by the acceleration sensor is the put-in operation. The first duration is longer than or equal to a first threshold. When acceleration continuously detected by the acceleration sensor in a second duration has a magnitude greater than zero and is in a downward direction, determine that the operation detected by the acceleration sensor is the take-out operation. The second duration is longer than or equal to a second threshold.

In one implementation, the one or more programs further include instructions operable to execute the following actions. A communication connection with a mobile terminal is established when the wearable device is in the wearing state. The communication connection with the mobile terminal is disconnected when the wearable device is in the non-wearing state.

In one implementation, the one or more programs further include instructions operable to execute the following actions. The infrared proximity sensor and the capacitive sensor are turned off, when the wearable device is in the wearing state or the non-wearing state.

It should be noted that the implementation process of the foregoing components will not be detailed herein and reference may be made to the foregoing method implementations.

Figure 5:
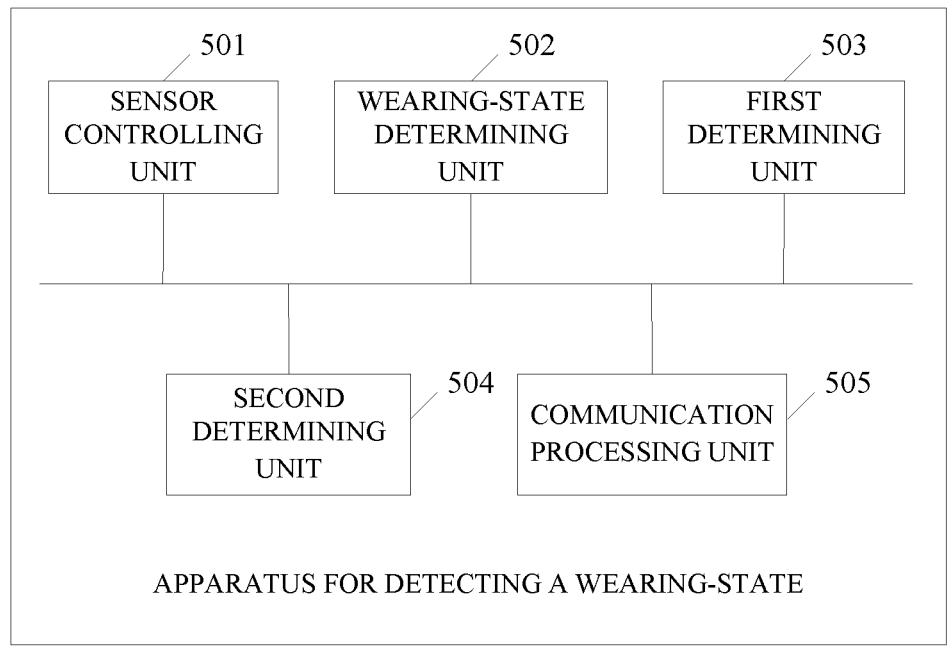
FIG. 5 is a schematic structural diagram illustrating an apparatus for detecting a wearing-state according to an implementation of the present disclosure.

FIG. 5 is a schematic structural diagram illustrating an apparatus for detecting a wearing-state according to an implementation of the present disclosure. The apparatus is applicable to the foregoing wearable device. As illustrated in FIG. 5, the apparatus for detecting a wearing-state includes a sensor controlling unit 501 and a wearing-state determining unit 502. The sensor controlling unit 501 is configured to turn on an infrared proximity sensor when an acceleration sensor detects a user operation. The wearing-state determining unit 502 is configured to determine whether the wearable device is in a wearing state or a non-wearing state according to a state of the infrared proximity sensor.

The user operation may be a put-in operation or a take-out operation, and the state of the infrared proximity sensor 10 can be a proximity state or a distant state. In one implementation, when the user operation is a put-in operation and the infrared proximity sensor is in a proximity state, the wearing-state determining unit 502 is configured to determine that the wearable device is in the wearing state. In another implementation, when the user operation is a take-out operation and the infrared proximity sensor is in a distant state, the wearing-state determining unit 502 is configured to determine that the wearable device is in the non-wearing state.

In one implementation, the apparatus for detecting a wearing-state further includes a second determining unit 504. The second determining unit 504 is configured to determine that the acceleration sensor detects the put-in operation, when acceleration continuously detected by the acceleration sensor in a first duration has a magnitude greater than zero and is in an upward direction. The first duration is longer than or equal to a first threshold. The second determining unit 504 is configured to determine that the acceleration sensor detects the take-out operation, when acceleration continuously detected by the acceleration sensor in a second duration has a magnitude greater than zero and is in a downward direction. The second duration is longer than or equal to a second threshold.

In one implementation, the sensor controlling unit 501 is further configured to turn on a capacitive sensor. The apparatus for detecting a wearing-state further includes a first determining unit 503 configured to determine whether a capacitance value detected by the capacitive sensor is equal to zero or not. In addition, the sensor controlling unit 501 may turn on the capacitive sensor when the infrared proximity sensor is turned on, the sensor controlling unit 501 may turn on the capacitive sensor when the infrared proximity sensor is in the proximity state, the sensor controlling unit 501 may turn on the capacitive sensor when the infrared proximity sensor is in the distant state, or other suitable time, which is not limited herein.

In one implementation, the wearing-state determining unit 502 is further configured to conduct at least one of: determining that the wearable device is in the wearing state, when the infrared proximity sensor is in the proximity state and the capacitance value detected by the capacitive sensor is not equal to zero, and determining that the wearable device is in the non-wearing state, when the infrared proximity sensor is in the distant state and the capacitance value detected by the capacitive sensor is equal to zero.

In one implementation, the apparatus for detecting a wearing-state further includes a communication processing unit 505. The communication processing unit 505 is configured to establish a communication connection with a mobile terminal when the wearable device is in the wearing state. The communication processing unit 505 is configured to disconnect the communication connection with the mobile terminal when the wearable device is in the non-wearing state.

In one implementation, the sensor controlling unit 501 is further configured to turn off the infrared proximity sensor or turn off the infrared proximity sensor and the capacitive sensor, when the wearable device is in the wearing state or the non-wearing state.

It is to be noted that, the wearable device described herein is presented in the form of functional units. The term "unit" used herein should be understood as the broadest meaning as possible, and an object for implementing functions defined by each "unit" may be, for example, an application-specific integrated circuit (ASIC), a single circuit, a processor (shared, dedicated, or chipset) and a memory for executing one or more software or firmware programs, a combinational logic circuit, and/or other suitable assemblies that can achieve the above described functions.

The sensor controlling unit 501, the wearing-state determining unit 502, the first determining unit 503, and the second determining unit 504 may be processors, controllers, or control circuits. The communication processing unit 505 may be a communication interface or an input-output circuit.

Implementations of the present disclosure further provide a non-transitory computer readable storage medium. The non-transitory computer readable storage medium stores a computer program which, when executed by a processor, causes the processor to carry out the method for detecting a wearing-state described above. For example, when the computer program is executed, an infrared proximity sensor of a wearable device is turned on, in response to a user operation to be detected. Whether the wearable device is in a wearing state or a non-wearing state is determined, according to a state of the infrared proximity sensor.

Implementations of the present disclosure further provide a computer program product. The computer program product includes a non-transitory computer readable storage medium configured to store computer programs which are operable with a computer to execute all or part of the operations of any of the methods described in the foregoing method implementations. The computer program product may be a software installation package. The computer may include a wearable device.

It is to be noted that, for the sake of simplicity, the foregoing method implementations are described as a series of action combinations, however, it will be appreciated by those skilled in the art that the present disclosure is not limited by the sequence of actions described. According to the present disclosure, certain steps or operations may be executed in other orders or simultaneously. Besides, it will be appreciated by those skilled in the art that the implementations described in the specification are exemplary implementations and the actions and modules involved are not necessarily essential to the present disclosure.

In the foregoing implementations, the description of each implementation has its own emphasis. For the parts not described in detail in one implementation, reference may be made to related descriptions in other implementations.

In the implementations of the disclosure, the apparatus disclosed in implementations provided herein may be implemented in other manners. For example, the device/apparatus implementations described above are merely illustrative; for instance, the division of the unit is only a logical function division and there can be other manners of division during actual implementations, for example, multiple units or assemblies may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be electrical connection or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device, and so on) to execute all or part of the steps described in the various implementations of the present disclosure. The memory includes various medium capable of storing program codes, such as a universal serial bus (USB) flash disk, a read-only memory (ROM), a random-access memory (RAM), a removable hard disk, Disk, compact disc (CD), or the like.

It will be understood by those of ordinary skill in the art that all or part of the steps of the various methods of the implementations described above may be accomplished by means of a program to instruct associated hardware, the program may be stored in a computer-readable memory, which may include a flash memory, a ROM, a RAM, Disk or CD, and so on.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A wearable device, comprising:
    an infrared proximity sensor, disposed on a housing of the wearable device, such that the infrared proximity sensor is occluded when the wearable device is worn by a user;
    an acceleration sensor, configured to detect a user operation, the user operation comprising a put-in operation or a take-out operation; and
    a control circuit, configured to:
        determine that the user operation detected by the acceleration sensor is the put-in operation, when acceleration continuously detected by the acceleration sensor in a first duration has a magnitude greater than zero and is upward in direction, the first duration being longer than or equal to a first threshold;
        determine that the user operation detected by the acceleration sensor is the take-out operation, when acceleration continuously detected by the acceleration sensor in a second duration has a magnitude greater than zero and is downward in direction, the second duration being longer than or equal to a second threshold;

turn on the infrared proximity sensor in response to detecting, by the acceleration sensor, the user operation; and determine whether the wearable device is in a wearing state or a non-wearing state, according to the user operation determined and a state of the infrared proximity sensor, the state of the infrared proximity sensor comprising a proximity state and a distant state.

2. The wearable device of claim 1, wherein the control circuit configured to determine whether the wearable device is in the wearing state or the non-wearing state, according to the user operation determined and the state of the infrared proximity sensor is configured to:

determine that the wearable device is in the wearing state, when the user operation is the put-in operation and the infrared proximity sensor is in the proximity state; and determine that the wearable device is in the non-wearing state, when the user operation is the take-out operation and the infrared proximity sensor is in the distant state.

3. The wearable device of claim 1, wherein the control circuit is further configured to:

turn off the infrared proximity sensor, after determining that the wearable device is in the wearing state or the non-wearing state.

4. The wearable device of claim 1, further comprising:

a capacitive sensor disposed on a first surface of the wearable device, wherein the first surface is in contact with skin of the user when the wearable device is worn by the user, and the control circuit is further configured to turn on the capacitive sensor and to determine whether a capacitance value detected by the capacitive sensor is equal to zero or not, wherein the capacitive sensor is turned on together with the infrared proximity sensor.

5. The wearable device of claim 4, wherein the control circuit configured to determine whether the wearable device is in the wearing state or the non-wearing state according to the user operation determined and the state of the infrared proximity sensor is configured to conduct at least one of:

determining that the wearable device is in the wearing state, when the user operation is the put-in operation, the infrared proximity sensor is in the proximity state, and the capacitance value detected by the capacitive sensor is not equal to zero; and determining that the wearable device is in the non-wearing state, when the user operation is the take-out operation, the infrared proximity sensor is in the distant state, and the capacitance value detected by the capacitive sensor is equal to zero.

6. The wearable device of claim 1, wherein the control circuit is further configured to:

establish a communication connection with a mobile terminal when the wearable device is in the wearing state; and disconnect the communication connection with the mobile terminal when the wearable device is in the non-wearing state.

7. A method for detecting a wearing-state, comprising:

turning on, by a wearable device, an infrared proximity sensor in response to detecting a user operation by an acceleration sensor, the infrared proximity sensor and the acceleration sensor being arranged in the wearable device, and the user operation comprising a put-in operation or a take-out operation;

determining, by the wearable device, whether the wearable device is in a wearing state or a non-wearing state according to the user operation determined and a state of the infrared proximity sensor, the state of the infrared proximity sensor comprising a proximity state and a distant state; and the method further comprising:

determining that the user operation detected by the acceleration sensor is the put-in operation, when acceleration continuously detected by the acceleration sensor in a first duration has a magnitude greater than zero and is upward in direction, the first duration being longer than or equal to a first threshold; and determining that the user operation detected by the acceleration sensor is the take-out operation, when acceleration continuously detected by the acceleration sensor in a second duration has a magnitude greater than zero and is downward in direction, the second duration being longer than or equal to a second threshold.

8. The method of claim 7, wherein determining, by the wearable device, whether the wearable device is in the wearing state or the non-wearing state, according to the user operation determined and the state of the infrared proximity sensor comprises:

determining, by the wearable device, that the wearable device is in the wearing state, when the user operation is the put-in operation and the infrared proximity sensor is in the proximity state; and determining, by the wearable device, that the wearable device is in the non-wearing state, when the user operation is the take-out operation and the infrared proximity sensor is in the distant state.

9. The method of claim 7, further comprising:

turning off, by the wearable device, the infrared proximity sensor, after determining that the wearable device is in the wearing state or the non-wearing state.

10. The method of claim 7, further comprising:

turning on a capacitive sensor together with the infrared proximity sensor, wherein the capacitive sensor is disposed on a first surface of the wearable device, and the first surface is in contact with skin of a user when the wearable device is worn by the user; and determining whether a capacitance value detected by the capacitive sensor is equal to zero or not.

11. The method of claim 10, wherein determining, by the wearable device, whether the wearable device is in the wearing state or the non-wearing state according to the user operation determined and the state of the infrared proximity sensor comprises:

determining, by the wearable device, that the wearable device is in the wearing state, when the user operation is the put-in operation, the infrared proximity sensor is in the proximity state, and the capacitance value detected by the capacitive sensor is not equal to zero; and determining, by the wearable device, that the wearable device is in the non-wearing state, when the user operation is the take-out operation, the infrared proximity sensor is in the distant state, and the capacitance value detected by the capacitive sensor is equal to zero.

12. The method of claim 7, further comprising:

establishing a communication connection with a mobile terminal when the wearable device is in the wearing state; and disconnecting the communication connection with the mobile terminal when the wearable device is in the non-wearing state.

13. The method of claim 7, further comprising:
before the wearable device determines that the wearable device is in the wearing state:
prompting, via an audio assembly of the wearable device, a user to input a voice for confirming that the wearable device has been worn;
collecting the voice input by the user via the audio assembly;
obtaining at least one keyword by parsing the voice; and
determining that at least one of the at least one keyword is matched with a set keyword.

14. The method of claim 7, further comprising:
before the wearable device determines that the wearable device is in the wearing state:
prompting, via an audio assembly of the wearable device, a user to input a tap-signal for confirming that the wearable device has been worn;
obtaining, via a tap-signal acquiring device of the wearable device, the tap-signal input by the user; and
determining that the tap-signal is matched with a set tap-signal.

15. A non-transitory computer readable storage medium storing a computer program which, when executed by a processor of a wearable device, causes the processor to carry out actions, comprising:
turning on an infrared proximity sensor of the wearable device, in response to a user operation to be detected by an acceleration sensor of the wearable device, and the user operation comprising a put-in operation or a take-out operation;
determining whether the wearable device is in a wearing state or a non-wearing state, according to the user operation determined and a state of the infrared proximity sensor, the state of the infrared proximity sensor comprising a proximity state and a distant state; and
the computer program being further executed by the processor to carry out actions, comprising:
determining that the user operation detected by the acceleration sensor is the put-in operation, when acceleration continuously detected by the acceleration sensor in a first duration has a magnitude greater than zero and is upward in direction, the first duration being longer than or equal to a first threshold; and
determining that the user operation detected by the acceleration sensor is the take-out operation, when acceleration continuously detected by the acceleration sensor in a second duration has a magnitude greater than zero and is downward in direction, the second duration being longer than or equal to a second threshold.

16. The non-transitory computer readable storage medium of claim 15, wherein the computer program executed by the processor to carry out the action of determining whether the wearable device is in the wearing state or the non-wearing state according to the user operation determined and the state of the infrared proximity sensor is executed by the processor to carry out actions, comprising:
determining that the wearable device is in the wearing state, when the user operation is the put-in operation and the infrared proximity sensor is in the proximity state; and
determining that the wearable device is in the non-wearing state, when the user operation is the take-out operation and the infrared proximity sensor is in the distant state.

17. The non-transitory computer readable storage medium of claim 15, wherein the computer program is further executed by the processor to carry out actions, comprising:
turning off the infrared proximity sensor, after determining that the wearable device is in the wearing state or the non-wearing state.

18. The non-transitory computer readable storage medium of claim 15, wherein the computer program is further executed by the processor to carry out actions, comprising:
turning on a capacitive sensor of the wearable device together with the infrared proximity sensor; and
determining whether a capacitance value detected by the capacitive sensor is equal to zero or not.

19. The non-transitory computer readable storage medium of claim 18, wherein the computer program executed by the processor to carry out the action of determining whether the wearable device is in the wearing state or the non-wearing state according to the user operation determined and the state of the infrared proximity sensor is executed by the processor to carry out actions, comprising:
determining that the wearable device is in the wearing state, when the user operation is the put-in operation, the infrared proximity sensor is in the proximity state, and the capacitance value detected by the capacitive sensor is not equal to zero; and
determining that the wearable device is in the non-wearing state, when the user operation is the take-out operation, the infrared proximity sensor is in the distant state, and the capacitance value detected by the capacitive sensor is equal to zero.

20. The non-transitory computer readable storage medium of claim 15, wherein the computer program is further executed by the processor to carry out actions, comprising:
establishing a communication connection with a mobile terminal when the wearable device is in the wearing state; and
disconnecting the communication connection with the mobile terminal when the wearable device is in the non-wearing state.

* * * * *